US005770291A

United States Patent [19]
Tambussi

[11] Patent Number: 5,770,291
[45] Date of Patent: Jun. 23, 1998

[54] BLANK FOR A LIGHTWEIGHT CASKET

[75] Inventor: William C. Tambussi, Cherry Hill, N.J.

[73] Assignee: Batesville Casket Company, Inc., Batesville, Ind.

[21] Appl. No.: 589,822

[22] Filed: Jan. 22, 1996

Related U.S. Application Data

[63] Continuation-in-part of Ser. No. 495,323, Jun. 27, 1995, Pat. No. 5,685,935, which is a continuation of Ser. No. 124,638, Sep. 22, 1993, abandoned.

[51] Int. Cl.$^6$ .................................................. A61G 17/013
[52] U.S. Cl. ............................... 428/55; 428/45; 428/47; 428/54; 428/73; 428/77; 428/116; 428/121; 27/4
[58] Field of Search .................................. 428/45, 47, 54, 428/55, 73, 77, 116, 121

[56] References Cited

U.S. PATENT DOCUMENTS

| | | |
|---|---|---|
| 678,348 | 7/1901 | Nichols . |
| 768,481 | 8/1904 | Post . |
| 1,234,180 | 7/1917 | Kersten . |
| 1,507,957 | 9/1924 | Edwards . |
| 2,494,473 | 1/1950 | Dowling . |
| 3,164,880 | 1/1965 | Hotchkiss . |
| 3,220,080 | 11/1965 | Connelly . |
| 3,490,114 | 1/1970 | Connelly et al. . |
| 3,574,906 | 4/1971 | Rittenhouse . |
| 3,729,786 | 5/1973 | Walding . |
| 3,969,798 | 7/1976 | Sahlin . |
| 4,044,435 | 8/1977 | Acton . |
| 4,151,630 | 5/1979 | Havey . |
| 4,176,431 | 12/1979 | Havey, III . |
| 4,261,083 | 4/1981 | Darby et al. . |
| 4,730,370 | 3/1988 | Elder . |
| 4,773,134 | 9/1988 | Kay . |
| 4,891,869 | 1/1990 | Nutting . |
| 4,902,365 | 2/1990 | Westlake, Sr. . |
| 4,944,076 | 7/1990 | Kay et al. . |
| 4,967,455 | 11/1990 | Elder . |
| 4,990,391 | 2/1991 | Veta et al. . |
| 5,035,032 | 7/1991 | Nutting . |
| 5,041,323 | 8/1991 | Rose et al. . |
| 5,106,668 | 4/1992 | Turner et al. . |
| 5,111,559 | 5/1992 | Mohr et al. . |
| 5,245,733 | 9/1993 | Goria . |
| 5,307,545 | 5/1994 | Stoltz . |
| 5,353,484 | 10/1994 | Woed et al. . |
| 5,454,141 | 10/1995 | Ozbun et al. . |

FOREIGN PATENT DOCUMENTS

| | | |
|---|---|---|
| 1145571 | 3/1969 | Japan . |
| Hei 3-198852 | 8/1991 | Japan . |
| Hei 3-88517 | 9/1991 | Japan . |
| Hei 4-3729 | 1/1992 | Japan . |
| Hei 4-3730 | 1/1992 | Japan . |
| 2 064 485 | 6/1981 | United Kingdom . |
| 2 114 498 | 8/1983 | United Kingdom . |
| 1535188 | 12/1988 | United Kingdom . |

*Primary Examiner*—Kathleen Choi
*Attorney, Agent, or Firm*—Barnes & Thornburg

[57] ABSTRACT

The present invention is directed to a blank for folding into a body containment section of a casket, the blank comprising: a first stabilizing surface element, the first stabilizing surface element being a unitary element, a second stabilizing surface element positioned to lie above the first stabilizing surface element and spaced-apart therefrom, the second stabilizing surface element being a unitary element, and a core having a top surface and a bottom surface, the core being sandwiched between the first and second stabilizing surface elements, the bottom surface of the core being attached to the first stabilizing surface element and the top surface of the core being attached to the second stabilizing surface element, the core including a first section and a second section spaced-apart from the first section to form an elongated gap therebetween, the first and second sections of the core being arranged so that the blank can be bent along the gap, each of the first and second sections of the core being attached to both the first and second unitary stabilizing surface elements.

32 Claims, 11 Drawing Sheets

5,770,291

BLANK FOR A LIGHTWEIGHT CASKET

RELATED APPLICATION

This application is a continuation-in-part of application Ser. No. 08/495,323, filed Jun. 27, 1995, now U.S. Pat. No. 5,685,935 which is a continuation of application Ser. No. 08/124,638, filed Sep. 22, 1993, now abandoned, the specification of which is herein incorporated by reference.

BACKGROUND AND SUMMARY OF THE INVENTION

The present invention relates to caskets, and particularly to a blank that can be formed into a lightweight casket suitable for cremation and interment ceremonies. More particularly, the present invention relates to a generally planar blank that can be easily shipped and can be readily formed into a body containment portion of a casket suitable for receiving the remains of the deceased. The present invention also relates to a casket lid for covering the body containment portion of the casket.

The disposal of the remains of the deceased can be accomplished by several means including burial and cremation. Providing a casket made from lightweight and inexpensive materials such as corrugated cardboard or the like for the disposal of such remains is known in the art. For example, U.S. Pat. Nos. 3,969,798 to Sahlin; 4,967,455 to Elder; 5,353,484 to Woedl et al.; 4,944,076 to Kay et al.; 4,773,134 to Kay; and 4,730,370 to Elder as well as Japanese Publications Hei 3[1991]-198852, Hei 3[1991]-88517, Hei 4[1992]-3729, and Hei 4[1992]-3730 to Takashi Makino all disclose caskets that can be made from lightweight materials.

In addition, it is known to construct a shell or base of a casket from a planar blank sheet. For example, the Sahlin '798 patent, the Elder '455 patent, the Woedl et al. '484 patent, and the Elder '370 patent all disclose planer blank sheets suitable for being formed into a casket. What is needed is a lightweight casket that exhibits high strength to avoid structural failure during use, that is made from inexpensive materials, and that is suitable for burial and cremation of the remains of a deceased.

According to the present invention a blank is provided for folding into a body containment portion of a casket. The blank includes a core having a top surface and a bottom surface. The core is divided into a first section and a second section that is spaced apart from the first section to form an elongated gap therebetween. The blank further includes a first stabilizing surface element positioned to lie beneath the core and attached to the bottom surfaces of the first and second sections of the core.

The blank also includes a second stabilizing surface element that is attached to the top surface of the core. The second stabilizing surface element has a bridge portion covering the gap between the first and second sections of the core so that the first section of the core, the second section of the core, the first stabilizing surface element, and the bridge portion of the second stabilizing surface element cooperate to define an elongated space. The first stabilizing surface element and the bridge portion are both bendable adjacent to the space so that the blank can be bent along the space.

The longitudinally extending core can be made from either a closed-cell material or an open-cell material. In preferred embodiments, the core is an open-cell material having a plurality of cylindrically shaped cells. The walls of the cylindrically shaped cells extend in a direction that is generally perpendicular to the first and second stabilizing surface elements. Typically, the cells are interconnected and are arranged to form a honeycomb pattern.

The core cooperates with the stabilizing surface elements to provide the blank and the casket made therefrom with structural rigidity. The core material operates to resist shear forces so that caskets made from such sandwiched blanks can be carried without buckling. At the same time, the stabilizing surface elements resist the bending forces acting on the sandwich. While the first and second stabilizing surface elements cooperate with the core to cause the blank to resist bending, the space between the first and second sections of the core provides a selected area along which the blank may be bent when forming the blank into a body containment portion of a casket.

The second stabilizing surface element covers the entire top surface of the core of the blank as well as covering the space between the first and second sections of the core. When the blank is formed into the body containment portion, the second stabilizing surface element becomes a continuous, seamless inner wall for the lightweight casket.

Additionally, the second stabilizing surface element can be provided with a coating of a water repellent material that prevents the penetration of water through the second stabilizing surface element. The seamless and waterproof inner wall of the casket prevents liquids that may collect on the second stabilizing surface element from seeping through the casket walls and passing out of the casket.

In addition, the core of the blank in accordance with the present invention is typically arranged so that once the blank is folded into a body containment portion, core material is present to reinforce the bottom of the casket, the two spaced-apart elongated sides of the casket, and the two transverse ends of the casket. Also, support inserts, rails, and stiffeners that may be desired for the body containment section or for a lid of the casket can be formed to include a core having first and second opposing surfaces, a stabilizing surface element attached to the first surface, and the second surface attached to the body containment section or the lid of the casket.

Additional objects, features, and advantages of the invention will become apparent to those skilled in the art upon consideration of the following detailed description of the preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
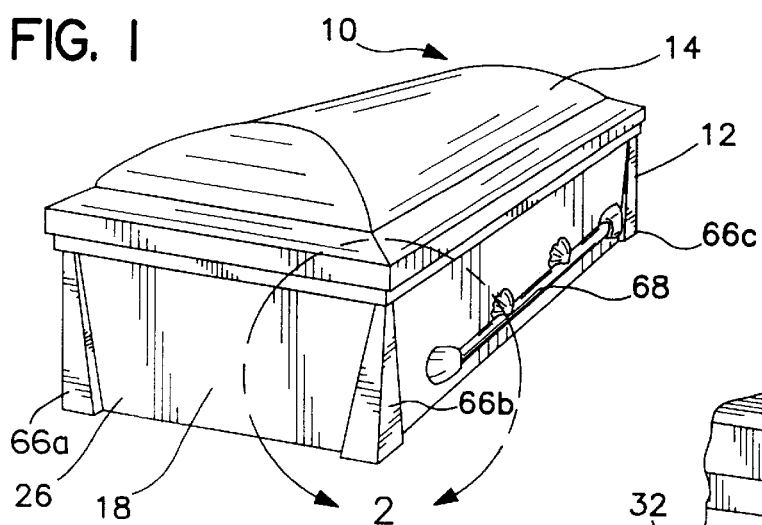
FIG. 1 is a perspective view of a lightweight casket constructed in accordance with the principles of the present invention showing a box-shaped body containment portion and a lid covering the body containment portion.
Figure 2:
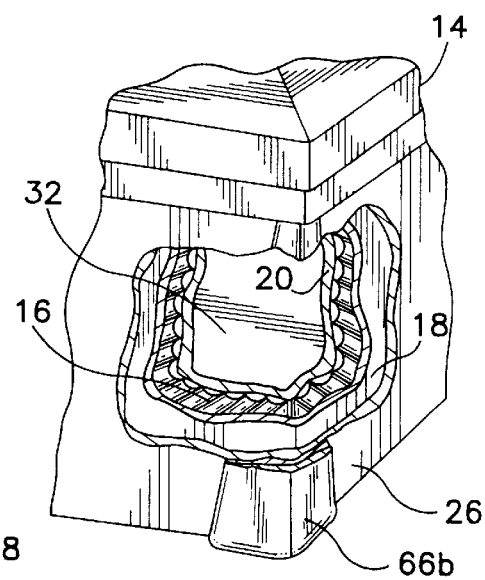
FIG. 2 is a view taken along line 2 of FIG. 1 with portions broken away showing the placement of various layers used in the construction of the casket.

Referring now to the drawings in detail wherein like reference numerals have been used throughout the various figures to designate like elements, there is shown in FIG. 1 a perspective view of the lightweight casket constructed in accordance with the principles of the present invention and designated generally as 10. Casket 10 is comprised essentially of body containment portion 12 and lid section 14. As shown in FIG. 2 for body containment portion 12, it is comprised largely of open cell core section 16, preferably a honeycomb pattern, being sandwiched between a first stabilizing surface element 18 and a second stabilizing surface element 20, both of which are preferably formed from a fluid resistant material. Lid 14 is constructed in a similarly layered manner.

Figure 3A:
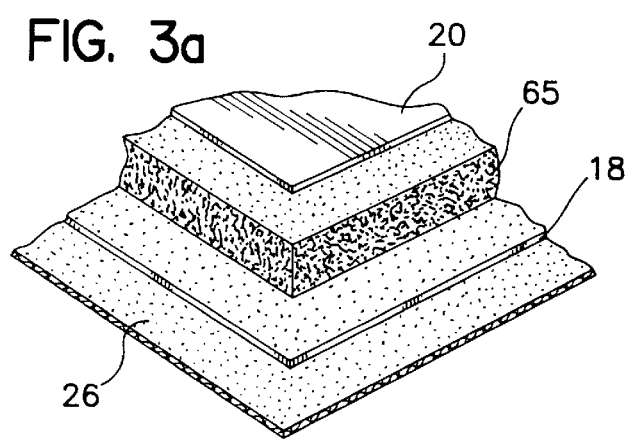
FIG. 3a is a perspective view with portions broken away of a blank in accordance with the present invention showing a first stabilizing surface element above and attached to a decorative layer, a second stabilizing surface element spaced-apart from and generally parallel to the first stabilizing surface element, and a core made from a closed-cell material such as polystyrene foam sandwiched between the first and second stabilizing surface elements.
Figure 3:
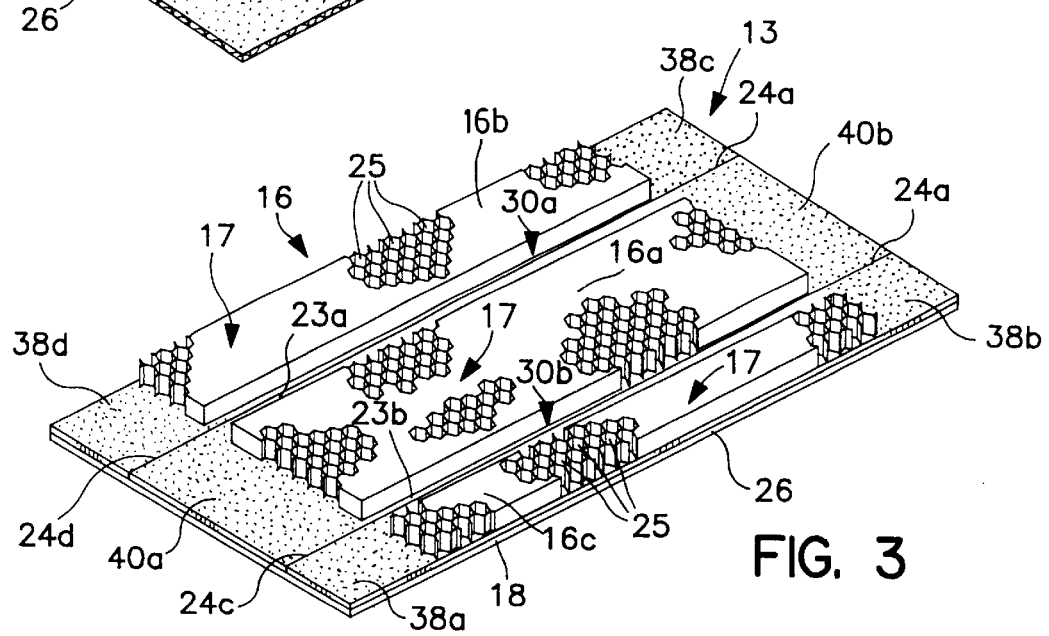
FIG. 3 is a perspective view of a portion of a first embodiment of a blank in accordance with the present invention used to construct a lightweight casket showing a core having first, second, and third spaced-apart sections positioned to lie above and attached to a first stabilizing surface element.

The formation of body containment portion 12 from a blank 13 is accomplished in part as shown in FIG. 3. Core 16 is cut to a substantially rectangular shape and of a size adapted to be folded to form casket 10. Core 16 includes a top surface 17, a bottom surface (not shown) attached to first stabilizing surface element 18. In addition, core 16 includes a first section 16a, a second section 16b that is spaced apart from first section 16a to form a longitudinal space 30a therebetween, and a third section 16c that is spaced-apart from first section 16a to form a second longitudinal space 30b therebetween.

Figure 4:
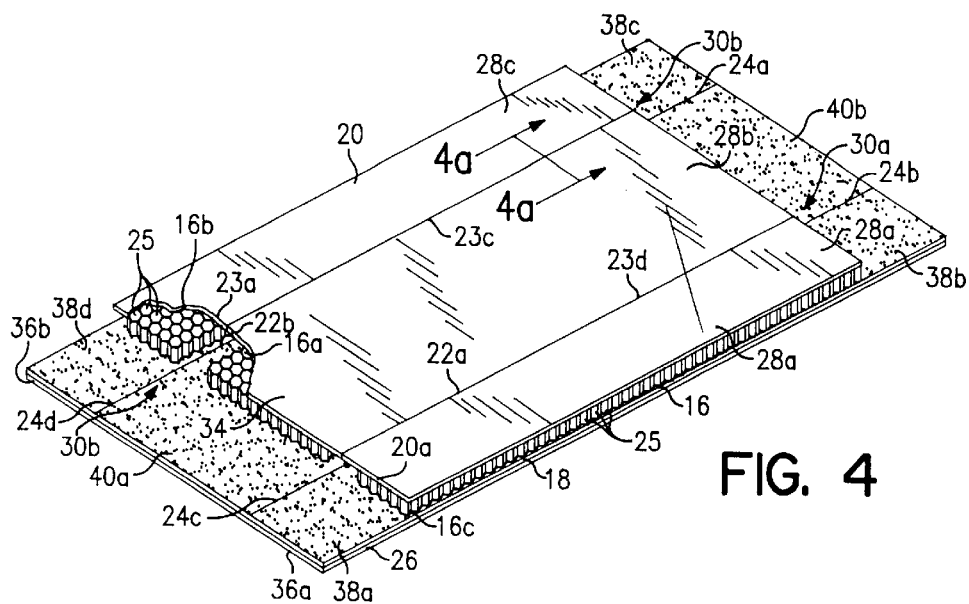
FIG. 4 is a view similar to FIG. 3 showing the blank including the first stabilizing surface element, the first, second, and third spaced-apart sections of the core, and the second stabilizing surface element attached to the top surface of the core.

In forming body containment portion 12, first stabilizing surface element 18 is placed underneath core 16 as shown in FIG. 3 and is attached to the bottom surface (not shown) of core 16. Second stabilizing surface element 20 is placed on top of core 16, as shown in FIG. 4, and is attached to top surface 17 of core 16.

Figure 6:
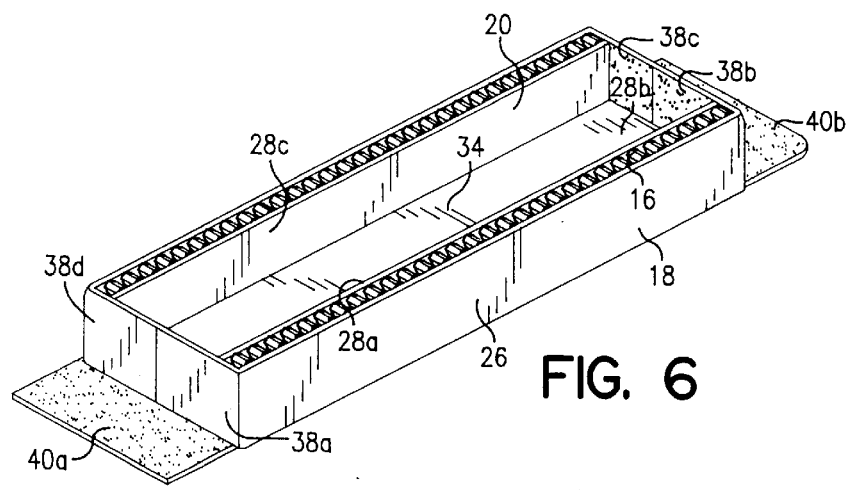
FIG. 6 is a view of the blank of FIG. 5 showing the blank after a folding stage.
Figure 7:
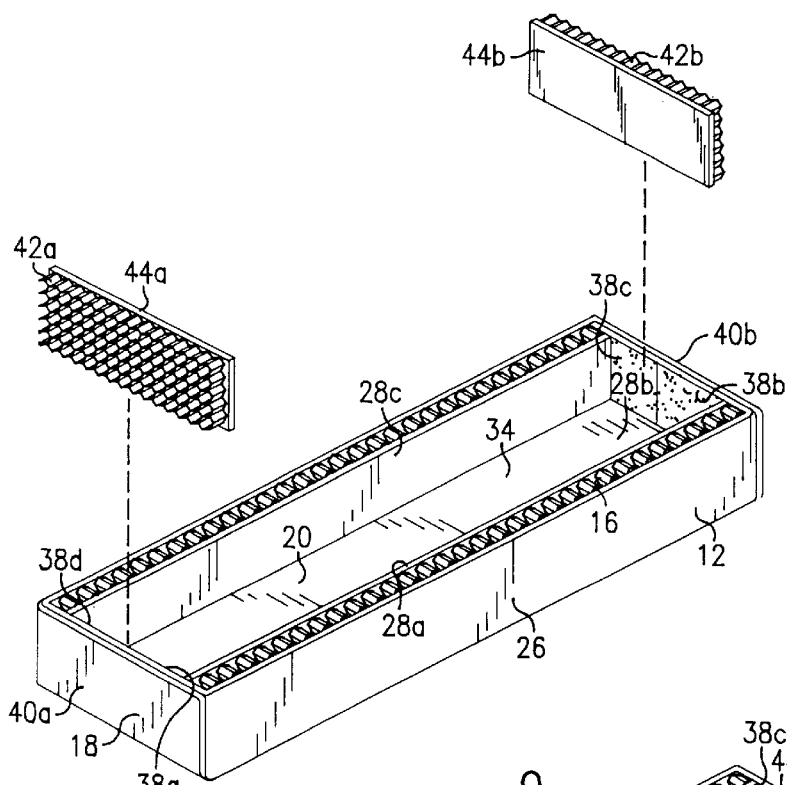
FIG. 7 is an exploded perspective view of the blank of FIG. 6 after an additional folding step to form a body containment portion of a casket, showing end inserts which are inserted adjacent to ends of the body containment portion.
Figure 8:
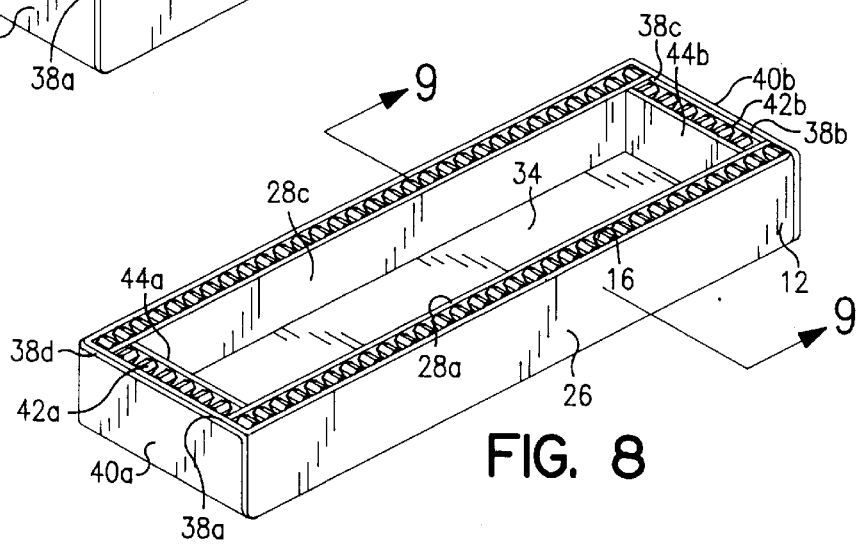
FIG. 8 is a view similar to FIG. 7 of a body containment portion of a lightweight casket formed from the blank of FIG. 5 showing a layer of decorative material and the first stabilizing surface element forming an outer shell of the body containment portion, a core attached to the first stabilizing surface element, a second stabilizing surface element attached to a top surface of the core and forming an inner wall of the body containment portion, and the third stabilizing surface element forming a bottom of the casket and attached to the additional layer of core (not shown)

First stabilizing surface element 18 is larger in length than core section 16 and is substantially rectangular in shape. First stabilizing surface element 18 is cut along four lines 24a, 24b, 24c, 24d, as shown in FIG. 3, and is scored to include fold lines 23a, 23b that are preferably arranged as continuations of cuts 24a, 24b, 24c, 24d. Fold lines 23a, 23b and cuts 24a, 24b, 24c, 24d facilitate the folding of blank 13 including core 16 and first stabilizing surface element 18 attached thereto into body containment portion 12 as shown in FIGS. 6, 7 and 8. Fold lines 23a, 23b are longitudinal and extend along the length of spaces 30a, 30b and cuts 24a, 24b, 24c, 24d extend from fold lines 23a, 23b to the ends of first stabilizing surface elements 18.

Core 16 is preferably formed from polymer coated cellulose fiber (PCCF) but environmentally safe plastic or the like will also suffice. Core 16 is preferably comprised of a plurality of longitudinally extending cylindrically shaped cells 25 interconnected and forming a honeycomb pattern as shown in FIGS. 3 and 4. Because of their cylindrical shape, the members have strong structural rigidity along their longitudinal axes.

Core 16 is adhered to the upper surface of scored and cut first stabilizing surface element 18 utilizing any suitable adhesive. In addition, a sheet 26 of decorative material is adhered to the underside of first stabilizing surface element 18 for incorporating a desired texture and appearance to casket 10 as shown in FIG. 3a.

Figure 4A:
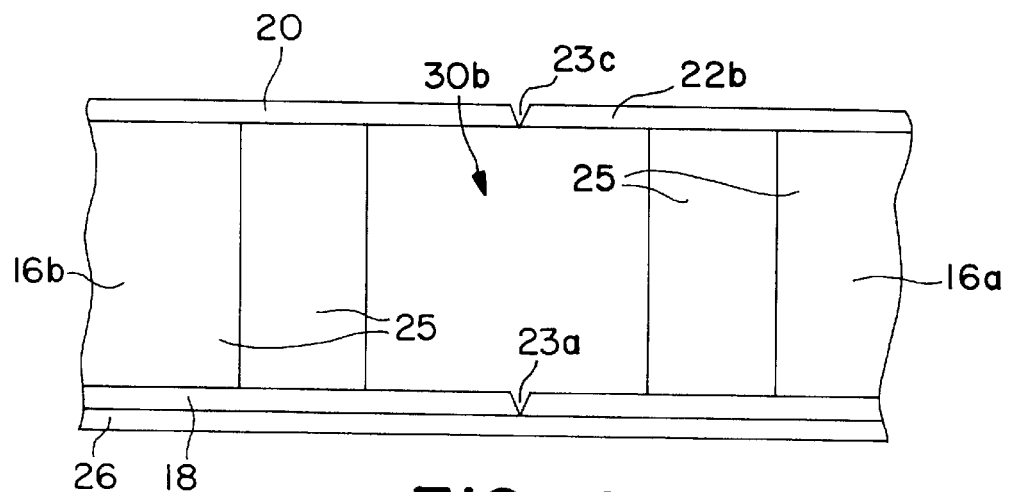
FIG. 4a is an enlarged view taken along line 4a—4a of FIG. 4 showing the first stabilizing surface element attached to an underlying sheet of decorative material, two spaced-apart core sections forming a gap therebetween and positioned to lie above the first stabilizing surface element, and a second stabilizing surface element attached to a top surface of the core, the second stabilizing surface element including a bridge portion bridging the gap between the core sections so that the first stabilizing surface element cooperates with the core sections and the bridge portion to define a space.

Second stabilizing surface element 20 is similarly adhered to core 16 as shown in FIG. 4. Second stabilizing surface element 20 is preferably a unitary sheet including bridge portions 22a, 22b that cover spaces 30a, 30b and that bridge spaces 30a, 30b between first and second sections 16a, 16b of core 16 and between first and third sections 16a, 16c of core 16 as shown in FIGS. 4 and 4a. Second stabilizing surface element 20 is scored with fold lines 23c, 23d along bridge portions 22a, 22b to facilitate folding of blank 13 after second stabilizing surface element 20 is attached thereto. Fold lines 23c, 23d are longitudinal and are positioned to lie generally above fold lines 23a, 23b and extend along the length of spaces 30a, 30b to divide second stabilizing surface element 20 into a first section 28a, a third section 28c, and a center second section 28b therebetween.

Core 16 is sandwiched between first and second stabilizing surface elements 18, 20 as shown in FIGS. 4 and 4a to provide structural rigidity to core 16 by maintaining cells 25 of core 16 in a substantially perpendicular orientation to applied forces. Core 16 acts as a pressure transfer mechanism and transfers the load to outer stabilizing surface element 18 when a force is applied thereto. By forming spaces 30a, 30b between sections 16a, 16b, 16c of core 16, blank 13 adjacent to spaces 30a, 30b lacks the structural rigidity of the portions of blank 13 engaging core 16 and having the complete sandwich structure. The "open" and, therefore, weaker sections of blank 13 adjacent to spaces 30a, 30b can be bent to form body containment portion 12 as shown in FIGS. 6 and 7.

Figure 5:
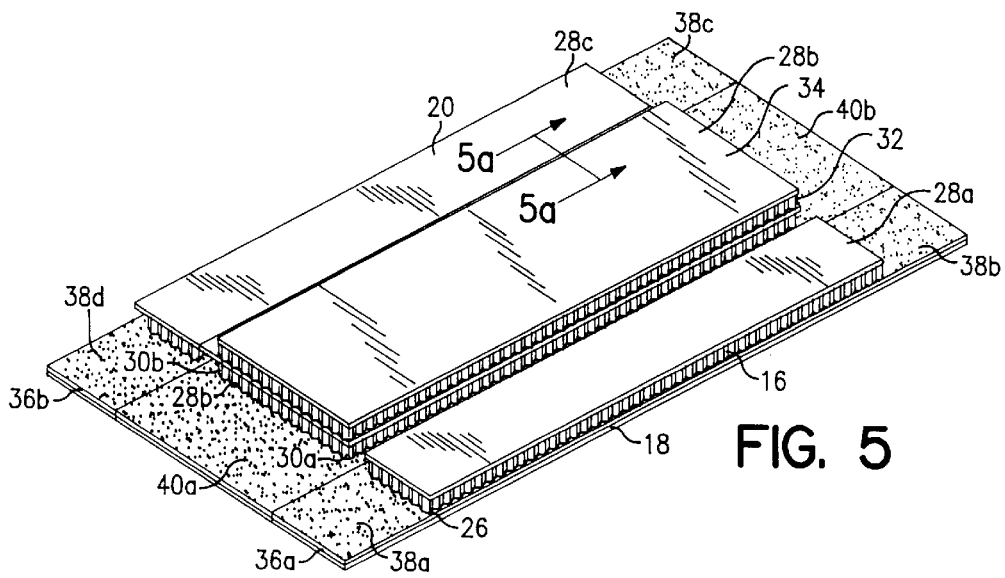
FIG. 5 is a view similar to FIG. 4 showing the blank including an additional layer of core attached to the second stabilizing surface element and a third stabilizing surface element attached to the additional layer of core.
Figure 5A:
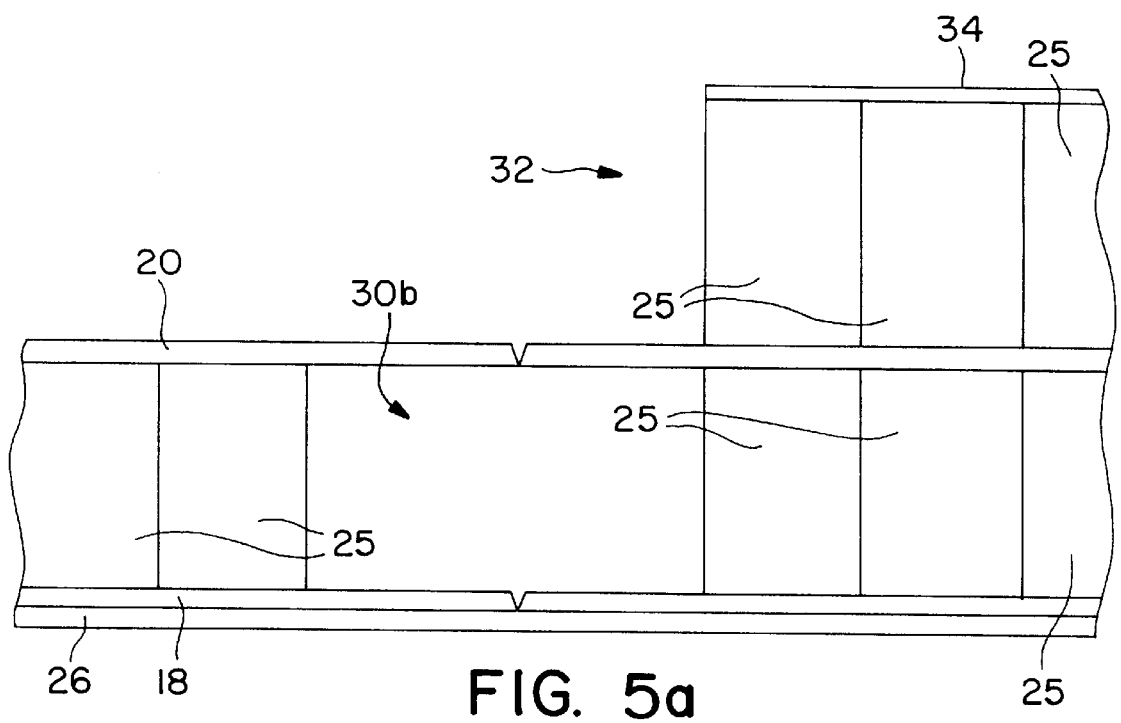
FIG. 5a is a view taken along line 5a—5a of FIG. 5 showing the additional layer of core attached to the second stabilizing surface element and the third stabilizing surface element attached to the additional layer of core.

In addition to core 16, an additional layer of core 32 can be attached to blank 13 over center section 28b of second stabilizing surface element 20, as shown in FIGS. 5 and 5a. Additional layer of core 32 is preferably of substantially the same size as center portion 28b. Also, a third stabilizing surface element 34 is typically attached to the top of additional layer of core 32. Additional layer of core 32 and third stabilizing surface element 34 further strengthen and increase the structural rigidity of the casket bottom and provide extra structural security.

Blank 13 as shown in FIG. 5 is complete and is ready for formation into body containment portion 12. To initiate this process, sides 36a, 36b of blank 13 are folded upwardly along fold lines 23a, 23b, 23c, 23d and cut lines 24a, 24b, 24c, 24d adjacent to spaces 30a, 30b. Upon folding sides 36a, 36b, corners 38a, 38b, 38c, 38d must be folded inward towards the center of body containment portion 12 as shown in FIG. 6. Corners 38a, 38b, 38c, 38d thus become part of the ends of body containment portion 12. However, the ends are further completed by folding end extensions 40a, 40b upwardly toward folded corners 38a, 38b, 38c, 38d. Before folding extensions 40a, 40b, adhesive is applied on the contact surfaces thereof for adherence to the outside surfaces of folded corners 38a, 38b, 38c, 38d. This provides a double shear path and increases the strength of the enclosure.

Referring now to FIG. 7, body containment portion 12 is ready for the insertion of end inserts 42a, 42b. Each end insert 42a, 42b is comprised of a rectangular portion of core material and a stabilizing surface element 44a, 44b adhered thereto as shown in FIGS. 7 and 8. Stabilizing surface elements 44a, 44b are adhered to inner surfaces of end inserts 42a, 42b facing the inside of body containment portion 12. End inserts 42a, 42b are inserted adjacent each end of body containment portion 12. The side of each end insert 42a, 42b having no stabilizing surface element adhered thereto is placed adjacent and adhered to inner surfaces of the folded corners 38a, 38b, 38c, 38d. End insert 42a is adhered to folded corners 38a, 38d and end insert 42b is adhered to folded corners 38b, 38c. At this point in the construction process body containment portion 12 is fully constructed as shown in FIG. 8.

Figure 9:
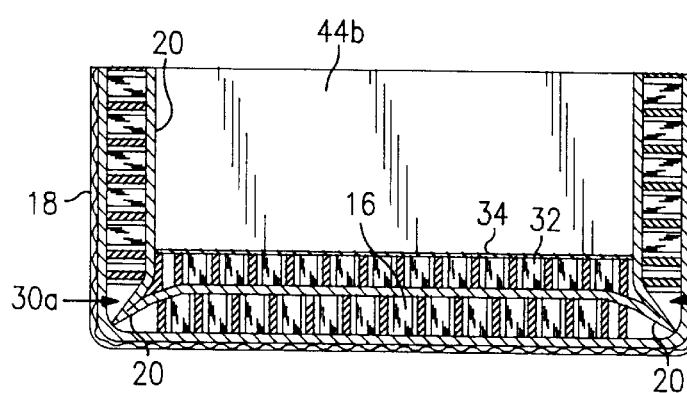
FIG. 9 is a sectional view taken along line 9—9 of FIG. 8 showing the decorative material and the first stabilizing surface element forming an outer shell of the lightweight casket, the core reinforcing the sides and the bottom of the casket, the additional layer of core reinforcing the bottom of the body containment portion, and the second stabilizing surface element forming a seamless inner wall of the body containment portion.

Second stabilizing surface element 20 is preferably a unitary sheet as shown in FIG. 4 covering the entire top surface of core 16. After blank 13 is folded to form body containment portion 12 shown in FIG. 8, second stabilizing surface element 20 provides a seamless inner wall for lightweight casket 10. The material of second stabilizing surface element 20 comprising bridge portions 22a, 22b collapses outwardly into spaces 30a, 30b upon folding of sides 36a, 36b of blank 13 as shown in FIG. 9.

Figure 10:
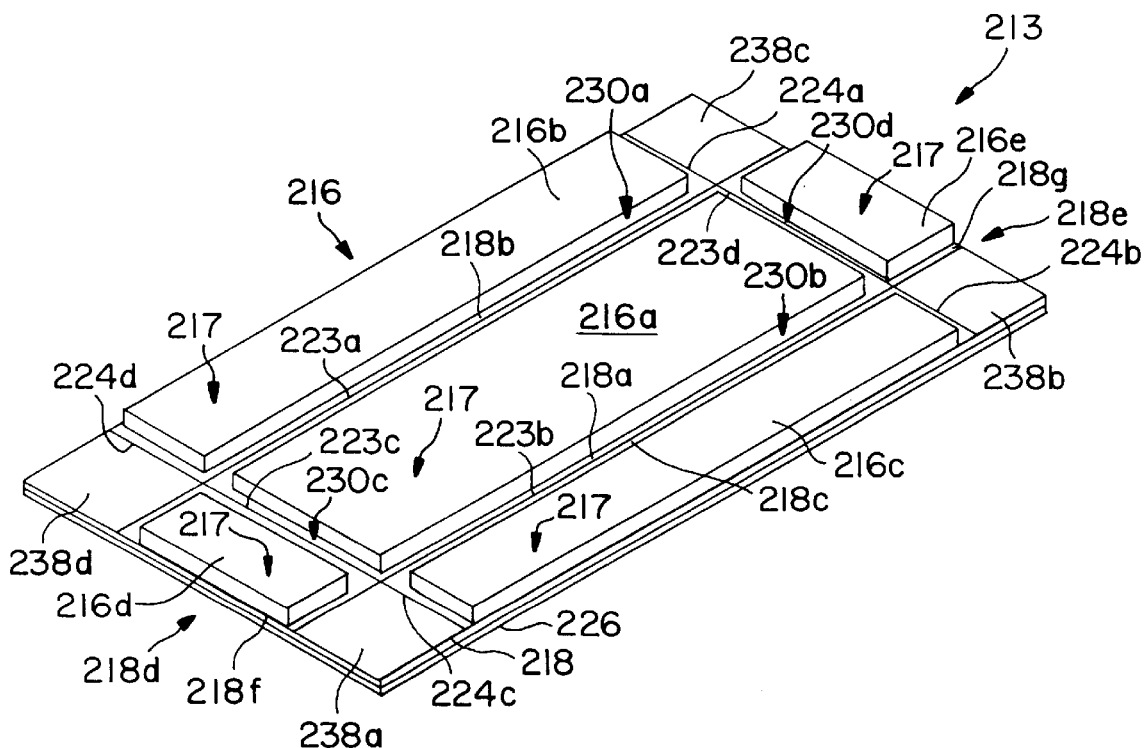
FIG. 10 is a view similar to FIG. 3 of a second embodiment of a blank in accordance with the present invention used to construct a lightweight casket showing a first-stabilizing surface element above and attached to a decorative layer and a core having first, second, third, fourth, and fifth spaced-apart sections positioned to lie above and attached to the first stabilizing surface element.

A second embodiment of a blank 213 and a body containment portion 212 formed therefrom is shown in FIGS. 10–13. Illustratively, a first stabilizing surface element 218 includes a generally centrally located center section 218a, a first side section 218b adjacent thereto and separated from center section 218a by scored fold line 223a, and a second side section 218c adjacent to center section 218a and separated therefrom by scored fold line 233b as shown in FIG. 10. Additionally, first stabilizing surface element 218 includes a first end section 218d and a second end section 218e. First end section 218d includes two corners 238a, 238d and a center portion 218f separated from corners 238a, 238d by fold lines 223a, 223b. Center portion 218f is separated from center section 218a by a scored fold line 223c and corners 238a, 238d are separated from side sections 218c, 218b by cut lines 224c, 224d. Second end section 218e likewise has two corners 238b, 238c and a center portion 218g separated from corners 238b, 238c by fold lines 223a, 223b. Center portion 218g is separated from center 218a by a scored fold line 223d and corners 238b, 238c are separated from side sections 218c, 218b by cut lines 224b, 224a.

Blank 213 also includes a core 216 having a top surface 217 and a bottom surface (not shown). A generally centrally located first core section 216a of core 216 is attached to center section 218a, a second core section 216b is attached to first side section 218b and spaced apart from first core section 216a to form a first space 230a therebetween, and a third core section 216c is attached to second side section 218c and spaced apart from first core section 216a to form a second space 230b therebetween as shown in FIG. 10. Core 216 also includes a fourth core section 216d attached to first end section 218d and spaced apart from first core section 216a to form a third space 230c therebetween and a fifth core section 216e attached to second end section 218e and spaced apart from first core section 216a to form a fourth space 230d therebetween. Preferably, fourth core section 216d is attached to center portion 218f of first end section 218d and fifth core section 216e is attached to center portion 218g of second end section 218e.

Figure 11:
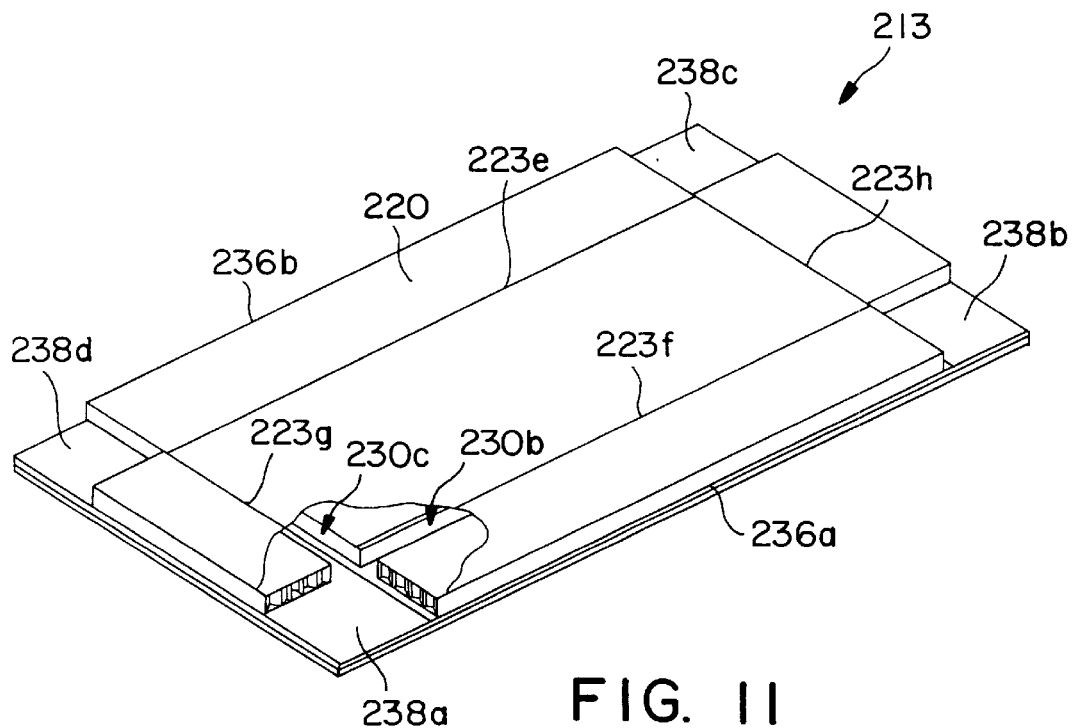
FIG. 11 is a view similar to FIG. 10 showing a second stabilizing surface element attached to a top surface of the core and covering each of the first, second, third, fourth, and fifth sections of the core as well as covering the spaces formed therebetween.
Figure 12:
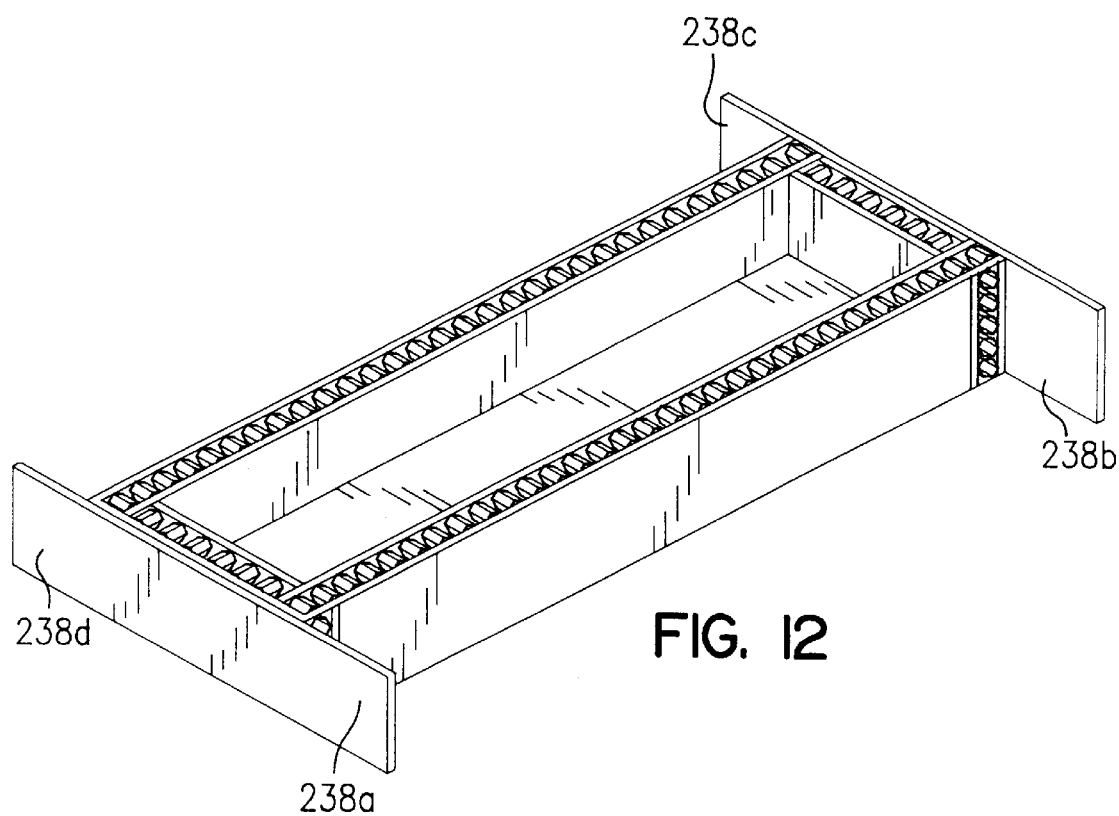
FIG. 12 is a view of the blank of FIG. 11 showing the blank after a folding stage.

A second stabilizing surface element 220 is attached to top surface 217 of core 216 and is configured to cover the entire top surface 217 of core 216 as shown in FIG. 11. Preferably, second stabilizing surface element 220 is unitary and seamless. Second stabilizing surface element 220 includes a scored first fold line 223e adjacent to first space 230a, a scored second fold line 223f adjacent to second space 230b, a scored third fold line 223g adjacent to third space 230c, and a scored fourth fold line 223h adjacent to fourth space 230d. Preferably, first and second fold lines 223e, 223f are generally parallel, and third and fourth fold lines 223g, 223h are generally parallel to one another and are generally perpendicular to first and second fold lines 223e, 223f.

Blank 213 can include an additional layer of core (not shown) attached to second stabilizing surface element 220 over center core section 216a. Blank 213 can also include a third stabilizing surface element (not shown) attached to a top surface of the additional layer of core. The additional layer of core and the third stabilizing surface element can further strengthen and increase the structural rigidity of the casket bottom and provide extra structural security thereto.

Figure 13:
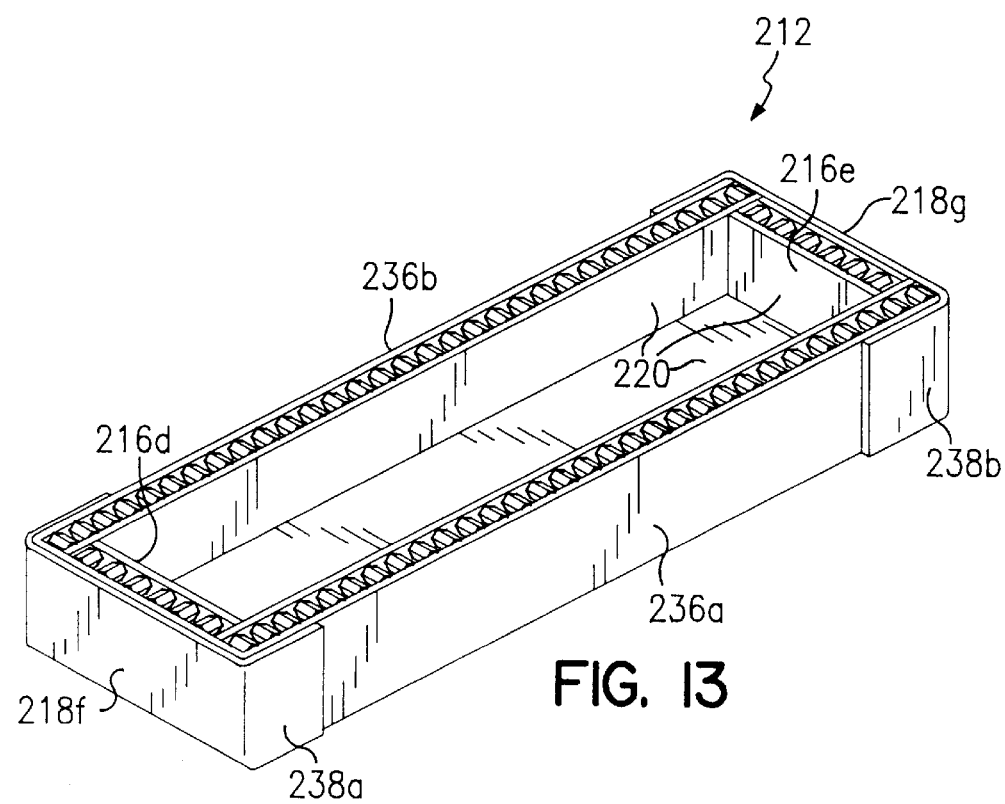
FIG. 13 is a view similar to FIG. 12 showing the blank after an additional folding step to form a body containment portion of a casket.

To form blank 213 into a body containment portion 212, sides 236a, 236b are folded upwardly along fold lines 223e, 223f formed on second stabilizing surface element 220, spaces 230a, 230b, and fold lines 223a, 223b on first stabilizing surface element 218, and separating along cut lines 224a, 224b, 224c, 224d on first stabilizing surface element 218. First and second end sections 218d, 218e are folded upwardly along fold lines 223c, 223d shown in FIG. 10 and fold lines 223g, 223h shown in FIG. 12. Corners 238a, 238b, 238c, 238d are folded inwardly toward the center of body containment portion 212 as shown in FIG. 13. Before folding corners 238a, 238b, 238c, 238d, adhesive is applied on the contact surfaces thereof for adherence to decorative material 226 attached to the bottom of first stabilizing surface element 218. At this point in the construction process, blank 213 is fully constructed and formed into a second embodiment of body containment portion 212 of lightweight casket 210 as shown in FIG. 13.

Figure 14:
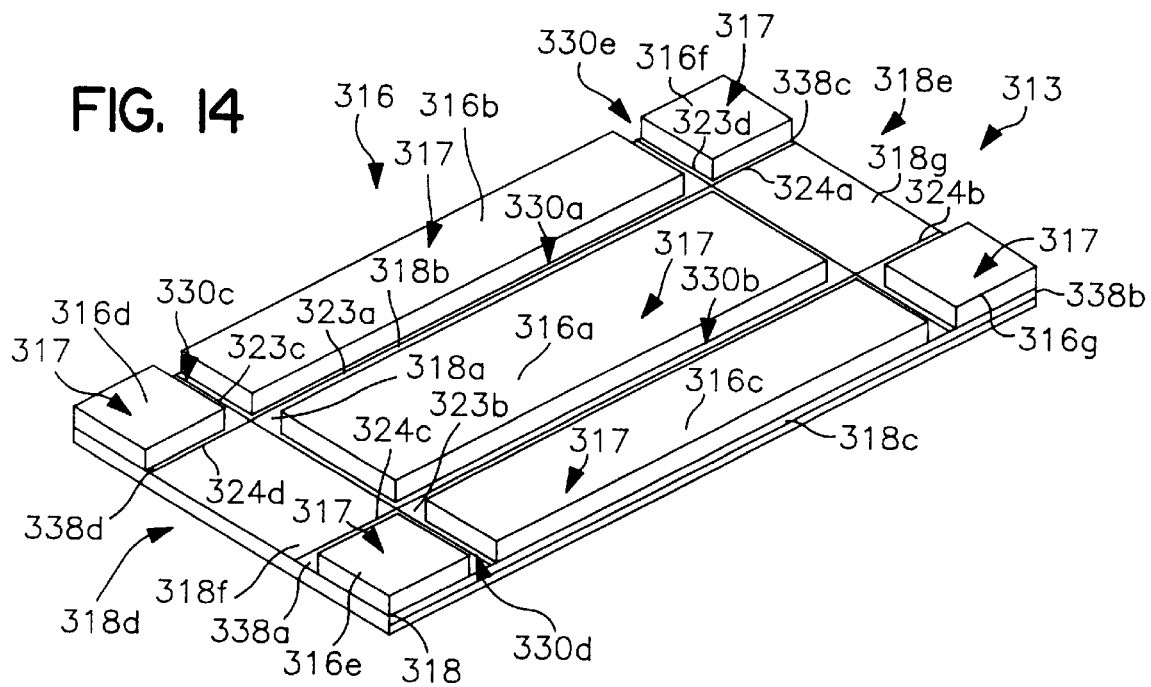
FIG. 14 is a view similar to FIG. 10 of a third embodiment of a blank in accordance with the present invention used to construct a lightweight casket showing a first stabilizing surface element above and attached to a decorative layer and a core having first, second, third, fourth, fifth, sixth, and seventh spaced-apart sections positioned to lie above and attached to the first stabilizing surface element.

A third embodiment of a blank 313 and a body containment portion 312 formed therefrom is shown in FIGS. 14–17. Illustratively, a first stabilizing surface element 318 includes a generally centrally located center section 318a, a first side section 318b adjacent thereto and separated from center section 318a by a scored fold line 323a, and a second side section 318c adjacent to center section 318a and separated therefrom by a scored fold line 323b, as shown in FIG. 14. Additionally, first stabilizing surface element 318 includes a first end section 318d separated from center section 318a and side sections 318b, 318c by a scored fold line 323c and a second end section 318e separated from center section 318a and side sections 318b, 318c by a scored fold line 323d. First end section 318d has two corners 338a, 338d and a center portion 318f separated from corners 338a, 338b by cut lines 324c, 324d. Second end section 318e has two corners 338b, 338c and a center portion 318g separated from corners 338b, 338c by cut lines 324b, 324a.

Blank 313 also includes a core 316 having a top surface 317 and a bottom surface (not shown). A generally centrally located first core section 316a of core 316 is attached to center section 318a, a second core section 316b attached to first side of section 318b and spaced apart from first core section 316a to form a first space 330a therebetween, and a third core section 316c is attached to second side section 318c and spaced apart from first core section 316a to form a second space 330b therebetween as shown in FIG. 14. Core 316 also includes a fourth core section 316d attached to corner 338d of first end section 318d and spaced apart from second core section 316b to form a third space 330c therebetween, a fifth core section 316e attached to corner 338a of first end section 318d and spaced apart from third core section 316c to form a fourth space 330d therebetween. Additionally, core 316 includes a sixth core section 316f attached to corner 338c of second end section 318e and spaced apart from second core section 316b to form a fifth space 330e therebetween and a seventh core section 316g attached to corner 338b of second end section 318e and spaced apart from third core section 316c to form a sixth space 330f therebetween.

Figure 15:
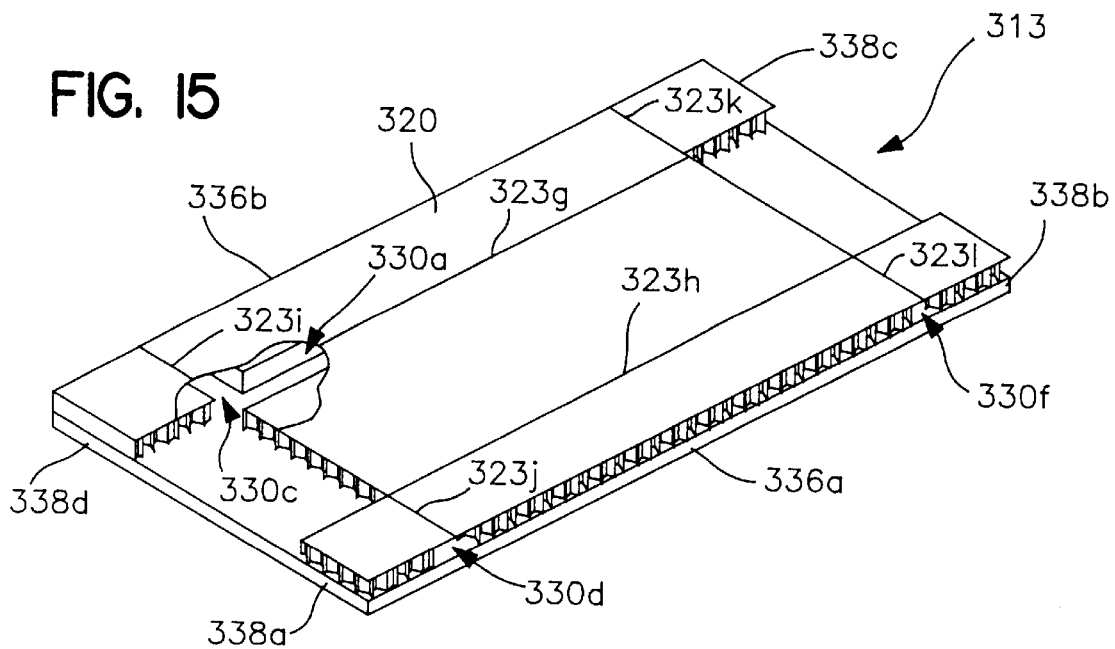
FIG. 15 is a view similar to FIG. 14 showing a second stabilizing surface element attached to a top surface of the core and covering each of the first, second, third, fourth, fifth, sixth, and seventh spaced-apart sections of the core as well as covering the spaces formed therebetween.

A second stabilizing surface element 320 is attached to top surface 317 of core 316 and is configured to cover the entire top surface 317 of core 316 as shown in FIG. 15. Preferably, second stabilizing surface element 320 is unitary and seamless. Second stabilizing surface element 320 includes a scored first fold line 323g adjacent to first space 330a, a scored second fold line 323h adjacent to second space 330b, a scored third fold line 323i adjacent to space 330c, a scored fourth fold line 323j adjacent to space 330d, a scored fifth fold line 323k adjacent to space 330e, and a scored sixth fold line 323l adjacent to space 330f. Preferably, first and second fold lines 323g, 323h are generally parallel, and third, fourth, fifth, and sixth fold lines 323i, 323j, 323k, 323l are generally parallel to one another and generally perpendicular to first and second fold lines 323g, 323h.

Blank 313 can include an additional layer of core (not shown) attached to second stabilizing surface element 320 over center core section 316a. Blank 313 can also include a third stabilizing surface element (not shown) attached to a top surface of the additional layer of core. The additional layer of core and the third stabilizing surface element can further strengthen and increase the structural rigidity of the casket bottom and provide additional structural security thereto.

Figure 16:
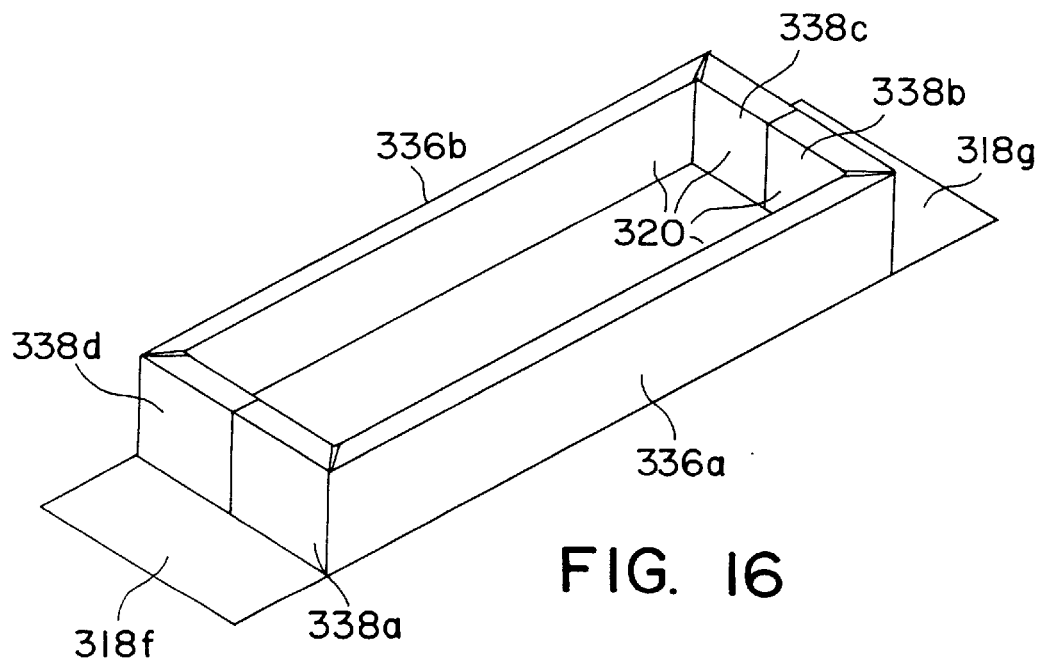
FIG. 16 is a view of the blank of FIG. 15 showing the blank after a folding stage.
Figure 17:
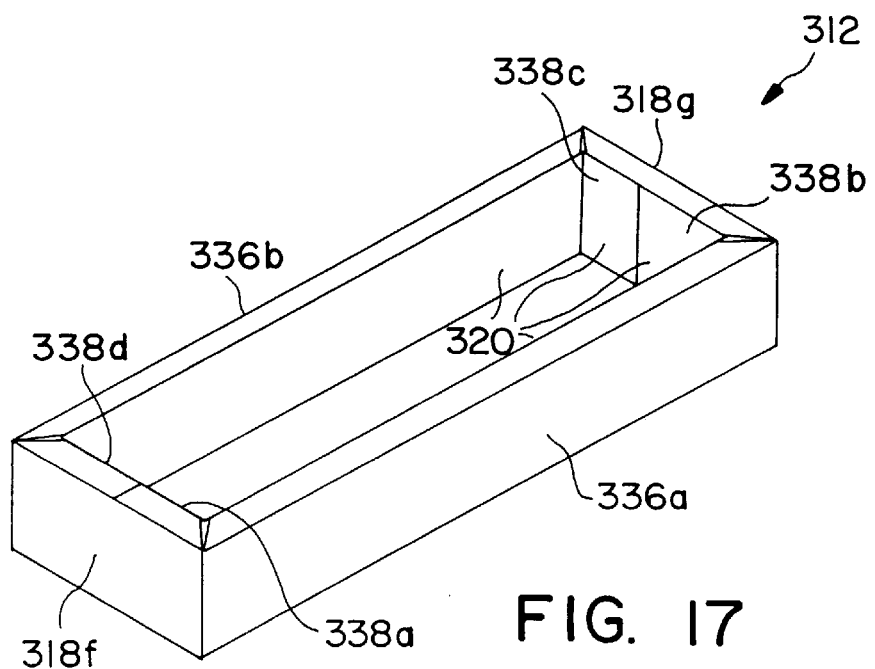
FIG. 17 is a view similar to FIG. 16 showing the blank after an additional folding step to form a body containment portion of a casket.

To form blank 313 into a body containment portion 312, sides 336a, 336b are folded upwardly along fold lines 323g, 323h formed on second stabilizing surface element 320, spaces 330a, 330b, fold lines 323a, 323b on first stabilizing surface element 318, and cut lines 324a, 324b, 324c, 324d on first stabilizing surface element 318. After folding sides 336a, 336b, corners 338a, 338b, 338c, 338d are folded inwardly toward the center of body containment portion 312 along fold lines 323i, 323j, 323k, 323l, and spaces 330c, 330d, 330e, 330f as shown in FIG. 16 so that corners 338a, 338b, 338c, 338d become part of the ends of body containment portion 312 as shown in FIG. 16. The ends of body containment portion 312 are further completed by folding center portion 318f of end 318d and center portion 318g of end 318e upwardly to engage folded corners 338a, 338b, 338c, 338d. Before folding center portions 318f of first end section 318b and second end section 318e, adhesive is applied on the contact surfaces thereof for adherence to the outside surfaces of folded corners 338a, 338b, 338c, 338d. At this point in the construction process, blank 313 is fully constructed and formed into the third embodiment of body containment portion 312 of lightweight casket 310 as shown in FIG. 17.

Figure 18A:
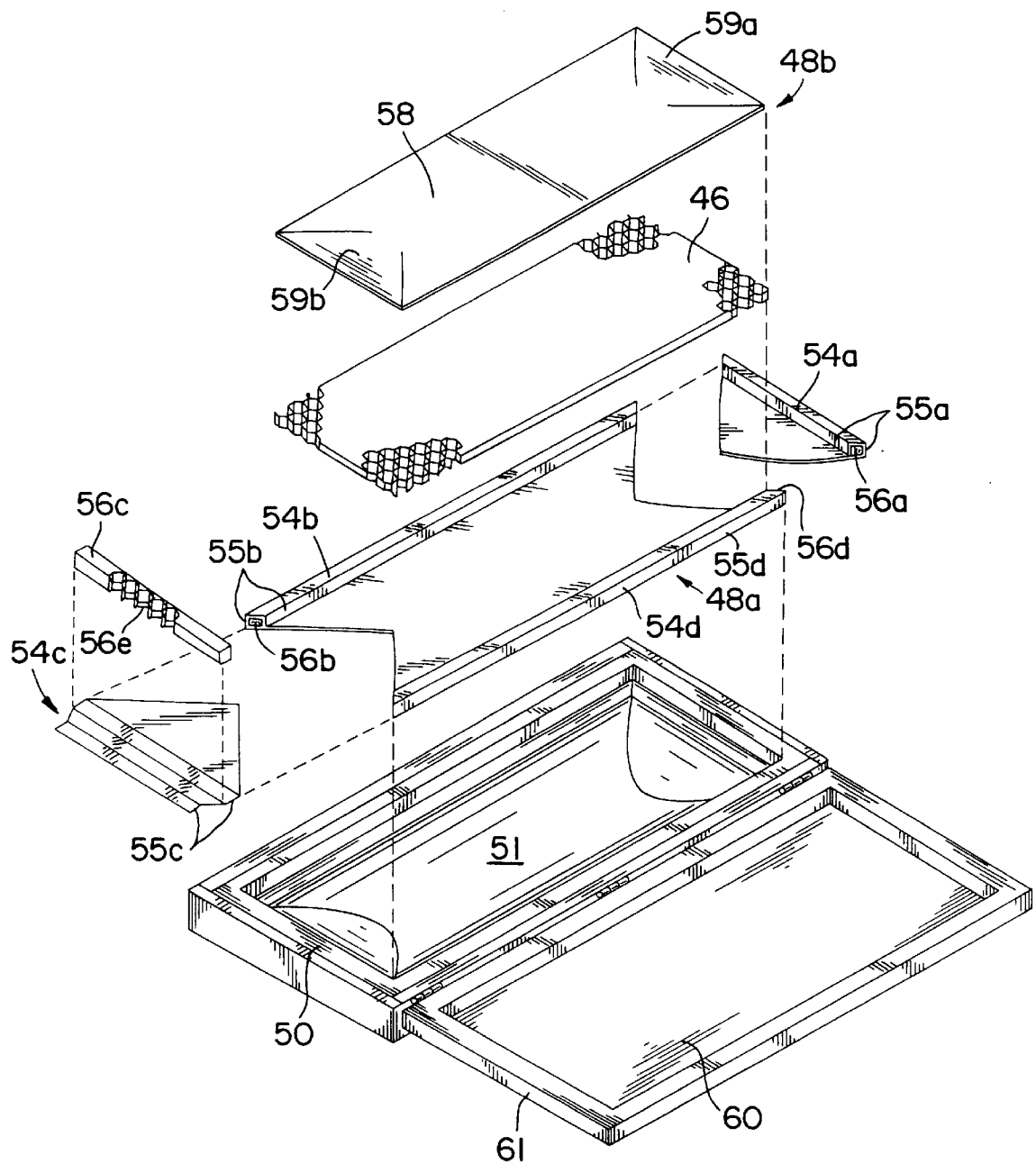
FIG. 18a is an exploded perspective view of a casket lid and of a jig for forming the casket lid showing the jig positioned to lie beneath elements of the lid, the jig cover being in an open position, and a 3-piece first lid stabilizing surface element positioned to lie beneath a lid core and a second lid stabilizing surface element, the lid core being sandwiched between the lower first and upper second lid stabilizing surface elements, a stabilizing bar including a bar core being attached to the perimeter edge of the first lid stabilizing surface element.

Lid 14 of lightweight casket 10 is fabricated as shown in FIGS. 18a–21. Lid 14 is formed by placing a lid core 46 preferably comprised of a honeycomb material between two lid stabilizing surface elements 48a, 48b as shown in FIG. 18a. The construction of lid 14 requires a somewhat different process than the construction of the body containment portion 12 due to the curved shaped of lid 14. The preferred method of constructing lid 14 is to construct a jig 50 having an outer portion resembling the shape of lid 14. Jig 50 is used to construct lid 14 in a step-like manner which includes the application of a pressure source 52.

Jig 50 has an outer section 51 shown in FIG. 18a which is substantially in the shape of lid 14 shown in FIG. 1. To initiate the lid construction process, first stabilizing surface element 48a is placed into jig 50. As shown in FIG. 18a, first stabilizing surface element 48a is constructed from one to three separate elements, a center element and two triangularly-shaped end elements. These elements are placed into jig 50. Each of the elements has an edge 54a, 54b, 54c, 54d formed into a rectangular shape and adapted to receive perimeter stabilizing bars 56a, 56b, 56c, 56d. Perimeter stabilizing bars 56a, 56b, 56c, 56d form the portion of lid 14 which contacts body containment portion 12, 212, 312. It is important that the edges which contact body containment portion 12, 212, 312 have structural rigidity as well as lid 14 itself. Therefore, bars 56a, 56b, 56c, 56d are placed into folded edges 54a, 54b, 54c, 54d and secured therein by adhering edges 54a, 54b, 54c, 54d thereto.

Each bar 56a, 56b, 56c, 56d includes a bar core 56e made from honeycomb material as shown in FIG. 18a, although each bar 56a, 56b, 56c, 56d can be made from any material that provides structural stability to lid 14 such as metal, wood, and particle board without changing the scope of the invention as presently perceived. Preferably, edges 54a, 54b, 54c, 54d include stabilizing surface element portions 55a, 55b, 55c, 55d connected to oppposing top and bottom surfaces of bar core 56e. Having edges 54a, 54b, 54c, 54d formed into an elongated rectangular shape and surrounding each bar core 56e provides additional strength and security to lid 14.

Lid core 46 is placed into jig 50 and over first stabilizing surface element 48a as shown in FIG. 18a. Preferably, lid core 46 is made from the same material as core 16, 216, 316 of body containment portion 12, 212, 312. Prior to the insert of lid core 46 into jig 50, adhesive is spread over first stabilizing surface element 48a for causing lid core 46 to adhere thereto. Lid core 46 is a substantially rectangular piece of material which is cut to a size which conforms to the shape of lid 14 and still contacts the entire surface of first stabilizing surface element 48a. It is not necessary to cut or provide fold lines in lid core 46 in any manner due to the flexibility of the same in conforming to the general shape of lid 14.

With lid core 46 inserted therein, second stabilizing surface element 48b is placed over the top of inserted lid core 46. Second stabilizing surface element 48b is rectangular but is comprised of an odd shaped section 58 having triangularly shaped but integral end sections 59a, 59b and having angular fold cuts as shown in FIG. 10. These sections 58, 59a, 59b are placed on lid core 46 as shown in FIG. 18a and conform to jig 50. Prior to placement onto lid core 46, adhesive is applied to the side of the sections which will contact lid core 46. With all elements in place, a pressure source 52 is applied to the integrated sections.

Figure 19:
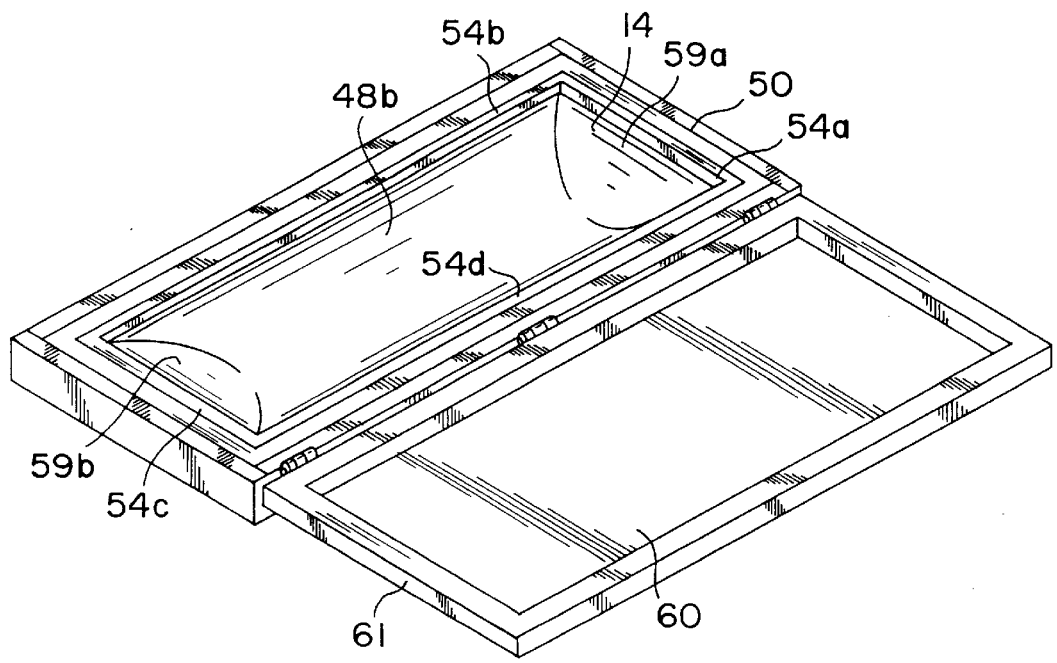
FIG. 19 is a perspective view of the jig with the jig cover in the open position.
Figure 20:
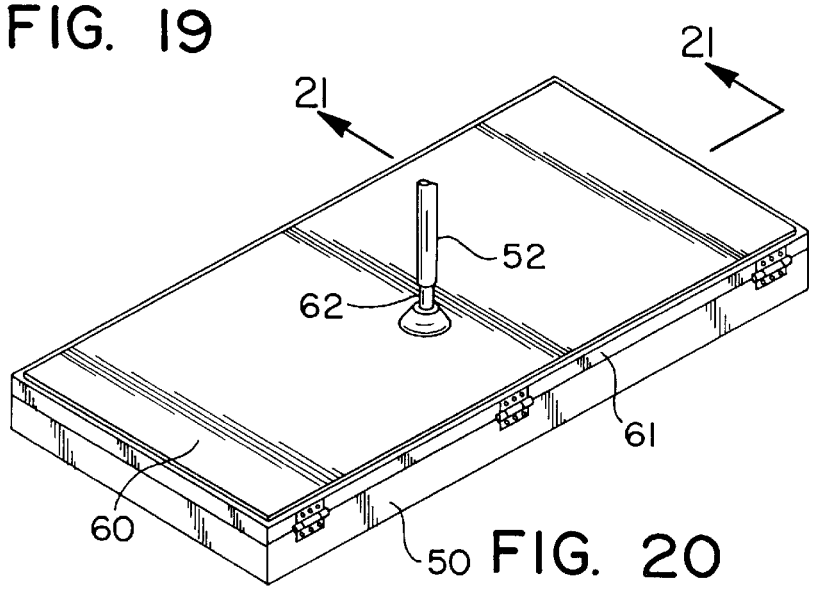
FIG. 20 is a perspective view of the jig with the jig cover in the closed position showing an air pressure connector mounted on the jig cover.
Figure 21:
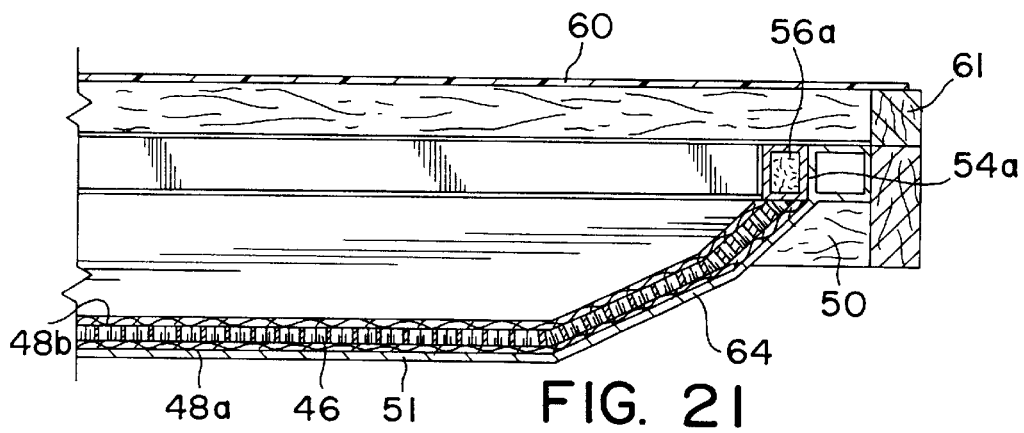
FIG. 21 is a sectional view taken along lines 21—21 of FIG. 20 showing the jig and the lid during formation of the lid.

As shown in FIGS. 19 and 20, a flexible cover 60 is hinged to and extends from the edges of jig 50 via a hinged door 61 and is placed over the integrated elements just discussed, forming an air tight seal. A pressure source connector 62 extends from flexible portion 60 so as to connect pressure source 52 thereto. Accordingly, pressure source 52 is connected to connector 62 and pressure is applied to lid 14. The pressure thereby forces the integrated sections together for adhering those which are contacting each other and forcing them into the shape of jig 50. In addition, a decorative layer 64 can be applied to lid 14 for matching body containment portion 12. When the air is removed and the sections are adhered together, jig 50 is disassembled and lid 14 can be removed, resembling the configuration shown in FIG. 1.

Figure 18B:
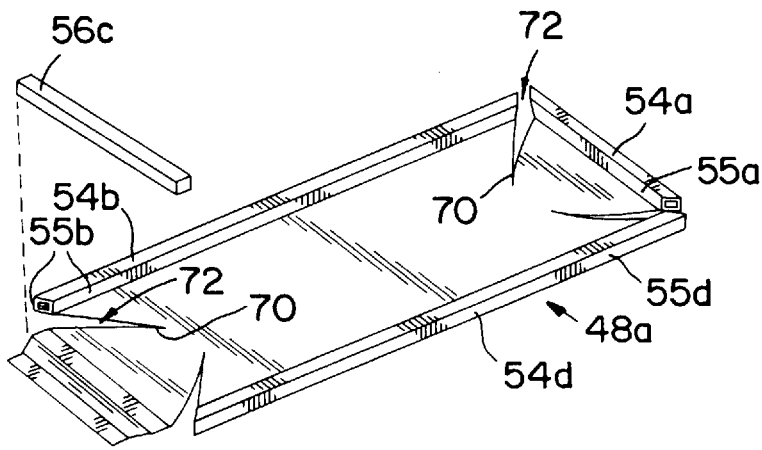
FIG. 18b is a view similar to FIG. 18a of a second embodiment of the first lid stabilizing surface element showing a unitary lid stabilizing surface element formed to include slits and cut-away portions configured to permit shaping of the lid stabilizing surface element.

Lid 14 can alternatively include a unitary first lid stabilizing surface element 48a as shown in FIG. 18b. Unitary first lid stabilizing surface element 48a is formed to include slits 72 extending inwardly from the corners of first lid stabilizing surface element 48a and terminating in score lines 70 that angle inwardly in generally the same direction as each respective slit. The width of slits 72 is greatest adjacent to the corners and narrows gradually inwardly toward score lines 70. Score lines 70 and slits 72 define generally triangularly-shaped but integral end sections 74a, 74b of unitary first lid stabilizing surface element 48a. Score lines 70 and slits 72 cooperate to allow end sections 74a, 74b to move in jig 50 so that lid 14 can assume the desired shape.

Figure 18C:
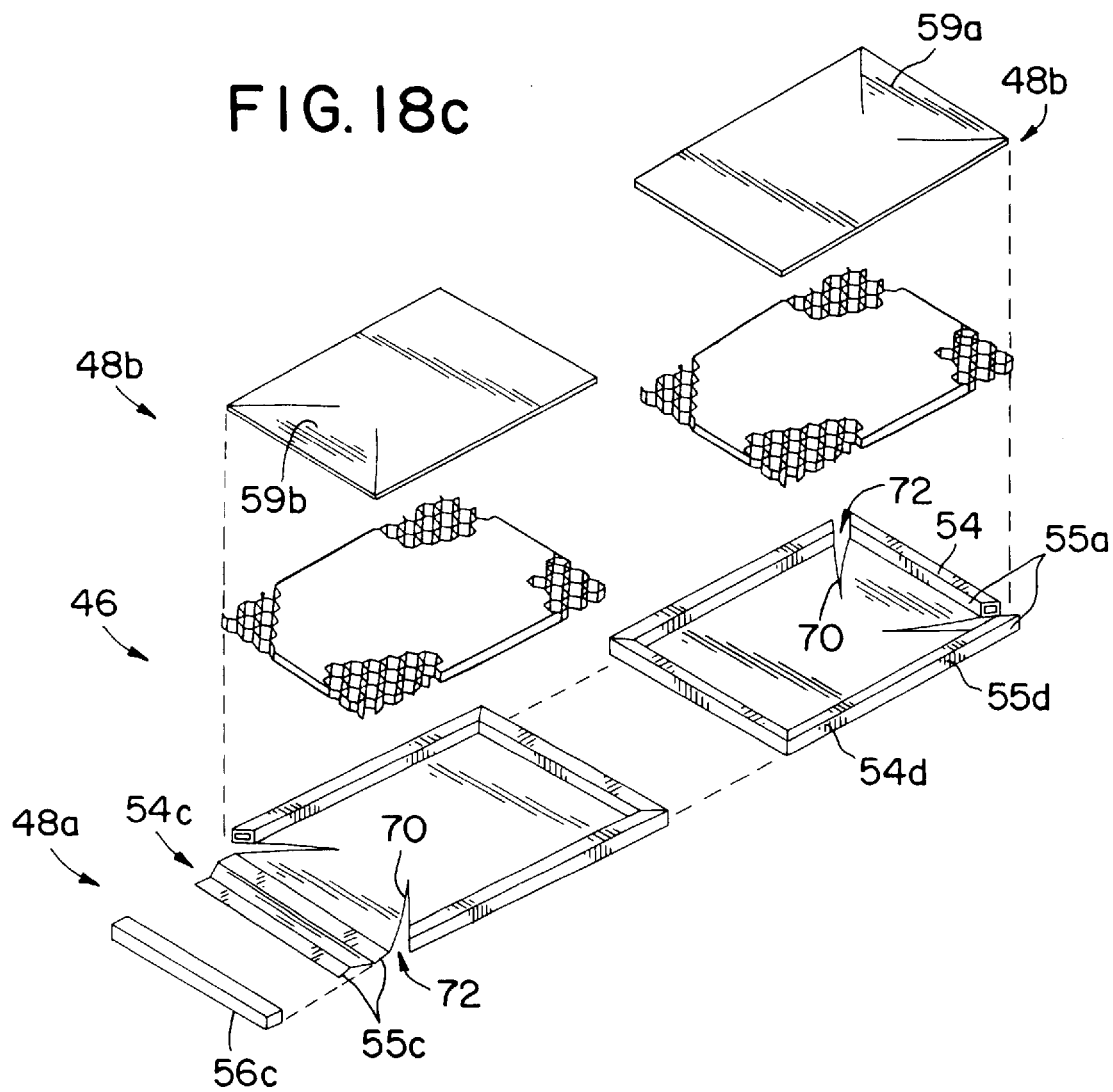
FIG. 18c is a view similar to FIG. 18a of a "cut-top" casket lid showing a cut-top first lid stabilizing surface element positioned to lie beneath a cut-top lid core and a cut-top second lid stabilizing surface element.

Lid 14 can also be formed in separate halves providing a "cut-top lid" which is desirable for viewing purposes. The formation of lid 14 into two separate halves is performed essentially the same as described above with reference to FIGS. 18a and 18b except that each half is constructed separately in jig 50 such that finished edges are formed all around as shown in FIG. 18c. When lid 14 is formed in separate halves, lid 14 includes cut-top first lid stabilizing surface elements 48a, cut-top second lid stabilizing surface elements 48b, and cut-top cores 46 sandwiched therebetween.

For both body containment portion 12 and lid 14, materials and patterns other than PCCF arranged in a honeycomb pattern can be used. For example, core 16, 32, 216, 316 can be comprised of an environmentally safe polystyrene-type material 65 in lieu of the honeycomb material where it is placed between two stabilizing surface elements as shown in FIG. 3a. Polystyrene foam placed between similar stabilizing surface elements exhibits substantially the same structural rigidity as the honeycomb portions and can be used interchangeably. Additionally, PCCF and other materials can be formed into truss patterns which also exhibit high structural rigidity when sandwiched between the stabilizing surface elements.

Upon completion of body containment portion 12, 212, 312 and lid 14 as substantially described, lightweight casket 10, 210, 310 is finished by attaching ornamental elements thereto to give casket 10, 210, 310 a richer appearance. As shown in FIG. 1, preformed corner pieces 66a, 66b, 66c, 66d are placed onto the corners of lightweight casket 10. In addition to appearance, corners 66a, 66b, 66c, 66d provide extra strength in body containment portion 12, 212, 312. Corners 66a, 66b, 66c, 66d are comprised substantially of two triangularly-shaped elements attached perpendicularly to each other. Corners 66a, 66b, 66c, 66d can be covered with the same decorative material as the rest of lightweight casket 10, 210, 310. Corners 66a, 66b, 66c, 66d can be simply glued to body containment portion 12, 212, 312 corners as shown in FIG. 1. In addition to the corners 66a, 66b, 66c, 66d, handles 68 can be securely attached to each side of lightweight casket 10 for carrying of the same. The inner portion of lightweight casket 10 in its finished condition is also designed in a decorative manner having linings and pillows.

Lightweight casket 10, 210, 310 is used in a manner similar to any other casket. Because of the structural rigidity providing by the sandwiching of either the open cell or solid surface core materials between stabilizing surface elements, there are no special precautions which must be considered in handling lightweight casket 10, 210, 310. The remains of the deceased are simply placed in casket 10, 210, 310 as with any other casket and it can be carried similar to any other casket. For cremation purposes, casket 10, 210, 310 is highly flammable and, as discussed, is not harmful to the environment and can simply be placed into the furnace without alteration.

The present invention may be embodied in other specific forms without departing from the spirit or essential attributes thereof and accordingly reference should be made to the appended claims rather than to the foregoing specification as indicating the scope of the invention.

I claim:

1. A blank for folding into a body containment section of a casket, the blank comprising:
   a first stabilizing surface element, the first stabilizing surface element being a unitary element,
   a second stabilizing surface element positioned to lie above the first stabilizing surface element and spaced-apart therefrom, the second stabilizing surface element being a unitary element, and
   a core having a top surface and a bottom surface, the core being sandwiched between the first and second stabilizing surface elements, the bottom surface of the core being attached to the first stabilizing surface element and the top surface of the core being attached to the second stabilizing surface element, the core including a first section and a second section spaced-apart from the first section to form an elongated gap therebetween, the first and second sections of the core being arranged so that the blank can be bent along the gap, each of the first and second sections of the core being attached to both the first and second unitary stabilizing surface elements.

2. The blank of claim 1, wherein the second stabilizing surface element includes a bridge portion covering the gap between the first and second sections of core.

3. The blank of claim 2, wherein the bridge portion of the second stabilizing surface element is formed to include an elongated scored fold line above the gap.

4. The blank of claim 3, wherein the first stabilizing surface element is formed to include an elongated scored fold line beneath the gap and adjacent to the scored fold line on the bridge portion.

5. The blank of claim 1, wherein the core further includes a third section spaced apart from the second section to form a second gap therebetween, the second stabilizing surface element further including a second bridge portion covering the second gap, the second and third sections of the core being arranged so that the blank can be bent along the second gap.

6. The blank of claim 5, wherein the second bridge portion of the second stabilizing surface element is formed to include a second scored fold line above the second gap.

7. The blank of claim 5, wherein the first, second, and third sections are rectangular planar sections and the second section is positioned to lie between the first and third sections.

8. The blank of claim 1, further comprising an additional layer of core having a top surface and a bottom surface, the bottom surface of the additional layer of core being attached to the second stabilizing surface element, and a third stabilizing surface element attached to the top surface of the additional layer of core.

9. The blank of claim 8, wherein the additional layer of core is sized to have substantially the same area and is substantially the same shape as the second section of the second stabilizing surface element, the bottom surface of the additional layer of core is attached to the second section of the second stabilizing surface element, and the third stabilizing surface element is sized to have substantially the same area and is substantially the same shape as the additional layer of core.

10. The blank of claim 1, wherein the core comprises an open-celled material.

11. The blank of claim 10, wherein each cell of the open-celled material includes a wall that is positioned to lie in orthogonal relation to the first and second stabilizing surface elements.

12. The blank of claim 11, wherein the cells are cylindrically shaped cells and the core includes a plurality of such cells interconnected and forming a honeycomb pattern.

13. The blank of claim 1, wherein the core comprises a closed-cell material.

14. The blank of claim 13, wherein the closed-cell material is polystyrene foam.

15. The blank of claim 1, further comprising a decorative material attached to the underside of the first stabilizing surface element.

16. The blank of claim 1, wherein the second stabilizing surface element covers the entire top surface of the core.

17. The blank of claim 16, wherein the second stabilizing surface element includes a coating made from a hydrophobic material to prevent the penetration of aqueous-based liquids through the second stabilizing surface element.

18. The blank of claim 1, wherein the first stabilizing surface element covers the entire bottom surface of the core.

19. The blank of claim 18, wherein the first stabilizing surface element includes a coating made from a hydrophobic material to prevent the penetration of aqueous-based liquids through the first stabilizing surface element.

20. The blank of claim 1, wherein a support plate is attached to the first stabilizing surface element adjacent to the gap between the first and second sections of the core.

21. The blank of claim 20, wherein the support plate includes an insert core having a top surface and a bottom surface, an insert stabilizing surface element attached to the top surface of the insert core, the bottom surface of the insert core being attached to the first stabilizing surface element.

22. A blank for folding into a body containment section of a casket, the blank comprising:

an elongated first stabilizing surface element having a generally centrally located center section with first and second longitudinally extending transversely spaced-apart sides and first and second transversely extending, longitudinally spaced-apart ends, a first end section appended to the first end of the center section, a second end section appended to the second end of the center section, a first side section appended to the first side of the center section, and a second side section appended to the second side of the center section, each of the first and second end sections and first and second side sections being foldable relative to the center section, the first stabilizing surface element being a unitary element, a core having a top surface and a bottom surface, the core being positioned to lie above the first stabilizing surface element and the bottom surface of the core being attached thereto, the core including a first section attached to the center section of the first stabilizing surface element, a second section attached to the first side section of the first stabilizing surface element, the second section being spaced apart from the first section to form a first space therebetween, and a third section attached to the second side section of the first stabilizing surface element, the third section being spaced apart from the first section to form a second space therebetween, and a second stabilizing surface element attached to the top surface of the core, the second stabilizing surface element including a first bridge portion covering the first space formed between the first and second sections and a second bridge portion covering the second space formed between the first and third sections, the second stabilizing surface element being a unitary element.

23. The blank of claim 22, further comprising a fourth section of the core positioned to lie on the first end section and a fifth section of the core positioned to lie on the second end section.

24. The blank of claim 23, wherein each of the first and second end sections of the first stabilizing surface element includes a first side portion adjacent to the first side section of the first stabilizing surface element, a second side portion adjacent to the second side section of the first stabilizing surface element, and a center portion therebetween, the fourth section of the core is attached to the center portion of the first end section, and the fifth section of the core is attached to the center portion of the second end section.

25. The blank of claim 23, wherein each of the first and second end sections of the first stabilizing surface element includes a first side portion adjacent to the first side section of the first stabilizing surface element, a second side portion adjacent to the second side section of the first stabilizing surface element, and a center portion therebetween, the fourth section of the core is attached to the first side portion of the first end section, and the fifth section of the core is attached to the first side portion of the second end section.

26. The blank of claim 25, further comprising a sixth section of the core attached to the second side portion of the first end section and a seventh section of the core attached to the second side portion of the second end section.

27. The blank of claim 2, wherein the bridge portion is elongated and covers the entire gap.

28. The blank of claim 2, wherein the bridge portion folds into the gap and toward the first stabilizing surface element when the blank is bent along the gap.

29. The blank of claim 2, wherein the second stabilizing surface element provides the body containment portion with a seamless inner surface adjacent to the first and second sections of the core after the blank is folded into the body containment portion.

30. The blank of claim 5, wherein the first bridge portion is elongated and covers the entire first gap and the second bridge portion is elongated and covers the entire second gap.

31. The blank of claim 5, wherein the first bridge portion folds into the first gap and toward the first stabilizing surface element when the blank is bent along the first gap and the second bridge portion folds into the second gap and toward the first stabilizing surface element when the blank is bent along the second gap.

32. The blank of claim 5, wherein the second stabilizing surface element provides the body containment portion with a seamless inner surface adjacent to the first, second, and third sections of the core after the blank is folded into the body containment portion.

* * * * *